April 19, 1966 J. A. OGLE ETAL 3,247,391
LIGHT GUN WITH COAXIALLY POSITIONED ELEMENTS
Filed Oct. 11, 1962 4 Sheets-Sheet 1

INVENTORS.
JAMES A. OGLE
BY JAMES E. JONES

Carl Fissell Jr.
AGENT

April 19, 1966  J. A. OGLE ETAL  3,247,391
LIGHT GUN WITH COAXIALLY POSITIONED ELEMENTS
Filed Oct. 11, 1962  4 Sheets-Sheet 2

INVENTORS.
JAMES A. OGLE
JAMES E. JONES
BY
Carl Fissell Jr.
AGENT

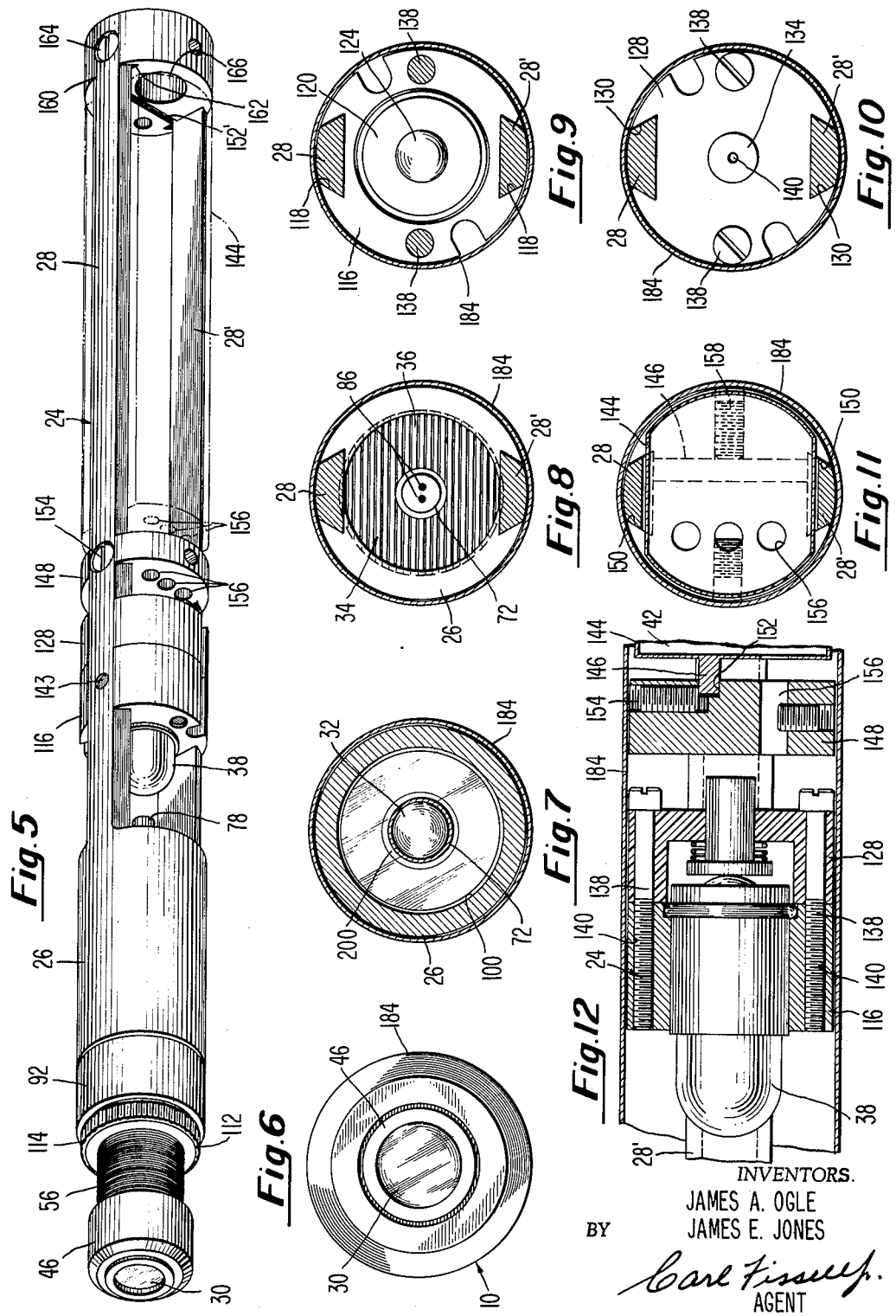

April 19, 1966     J. A. OGLE ETAL     3,247,391
LIGHT GUN WITH COAXIALLY POSITIONED ELEMENTS
Filed Oct. 11, 1962     4 Sheets-Sheet 4
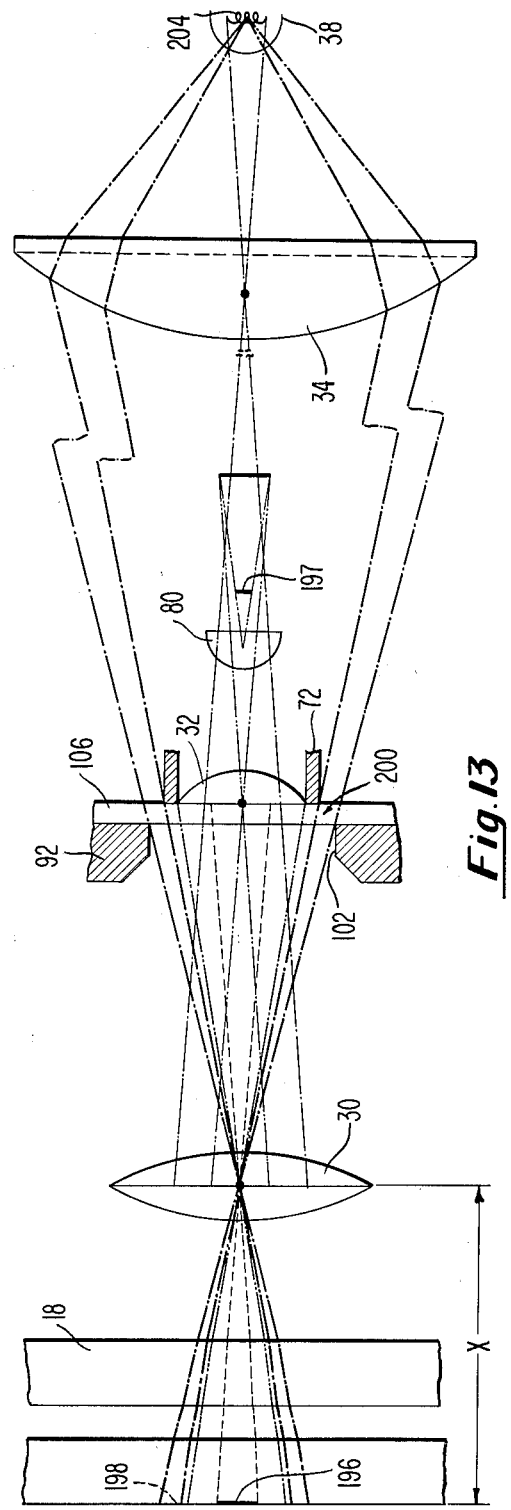
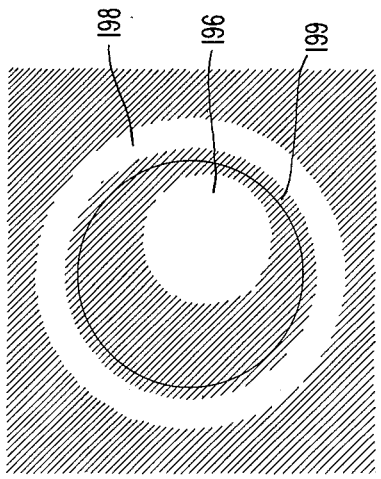
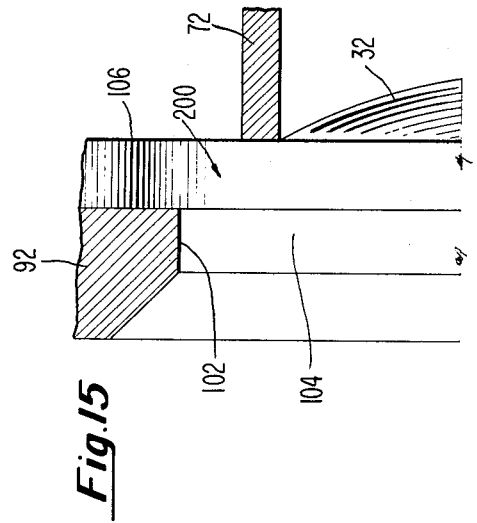
INVENTORS.
JAMES A. OGLE
JAMES E. JONES
BY
AGENT 3,247,391
LIGHT GUN WITH COAXIALLY POSITIONED ELEMENTS
James A. Ogle, Paoli, and James E. Jones, Malvern, Pa., assignors to Burroughs Corporation, Detroit, Mich., a corporation of Michigan
Filed Oct. 11, 1962, Ser. No. 229,831
7 Claims. (Cl. 250—216)

This invention relates to light responsive control apparatus and more particularly, although not necessarily exclusively, to photo-electrically activated apparatus for sensing and/or reading light signals and converting these light signals into electrical signals for application to other associated auxiliary apparatus. With more specificity, the invention relates to a so-called light gun useful in reading light information appearing on the face of a cathode ray tube, such, for example, as the cathode ray tubes used in radar or other similar types of communication-detection-interrogation systems, for commercial as well as military applications.

Available apparatus for employment as hereinbefore set forth, often takes the form of a pistol-grip gun-shaped device which includes one or more movable or adjustable internally operable elements, e.g., light chopper, etc., and which is generally of a relatively large size and often difficult to handle. Such apparatus involves certain problems which arise in the use thereof relative to the sensitivity or lack of sensitivity of the device to the ambient light and the capability of such apparatus to selectively read the light information which it is desired to be reproduced. In an efficient electro-optical apparatus of the foregoing type there should be no response to the local light present in the area or space in which the apparatus is to be operated and, in addition, the apparatus shoud not be affected by light information near the information area which is to be read by such apparatus. Also, it is important that the piece of equipment be easy to focus on the target area which is to be interrogated or read.

It is therefore a principal object of the present invention to solve the foregoing problems in a new and novel manner.

It is another object of the invention to provide an improved electro-optical transducer which is comparatively simple in construction, involves no moving parts, and which is highly efficient and sensitive in its operation.

A further object of the invention is the provision of an exceptionally small pencil-like, light-weight, easily and simply focused electro-optical transducer.

It is also an object of the invention to provide an electro-optical transducer which is simple and efficient in fabrication, assembly, service and/or repair.

Still another object of the invention is to provide an electro-optical transducer in which certain of the component electrical and optical elements are axially aligned and substantially self supporting.

In accordance with the foregoing objects and first briefly described, the present invention comprises electro-photo-optical transducer apparatus having means for generating a pattern of light effective to delineate a target area on the face of a cathode ray tube. Means is provided for translating the light signal which is picked up from this area into an electrical signal for transmission to a further utilization apparatus such as a computer. All of the optical elements of the apparatus are disposed concentrically of the transducer housing and provide optimum sensitivity, efficiency of operation and ease of focusing.

These and other objects and advantages of the invention will be explained in further detail with reference to the accompanying drawings in which:

FIG. 5 is an enlarged isometric view of the apparatus of FIG. 2 with external cover removed;

FIG. 6 is a greatly enlarged end view of the left front end portion of the apparatus shown in FIG. 5;

FIG. 7 is a sectional view along the line 7—7 of FIG. 3;

FIG. 8 is a sectional view along the line 8—8 of FIG. 3;

FIG. 9 is a sectional view along the line 9—9 of FIG. 3;

FIG. 10 is a sectional view along the line 10—10 of FIG. 3;

FIG. 11 is a sectional view along the line 11—11 of FIG. 4;

FIG. 12 is a sectional view along the line 12—12 of FIG. 3;

FIG. 13 is a schematic view of symbolized ray traces for the present invention;

FIG. 14 is an enlarged detail view of the area of the circle of light provided by the apparatus; and FIG. 15 is an enlarged view of the portion of the apparatus enclosed by the circle 15.

Figure 1:
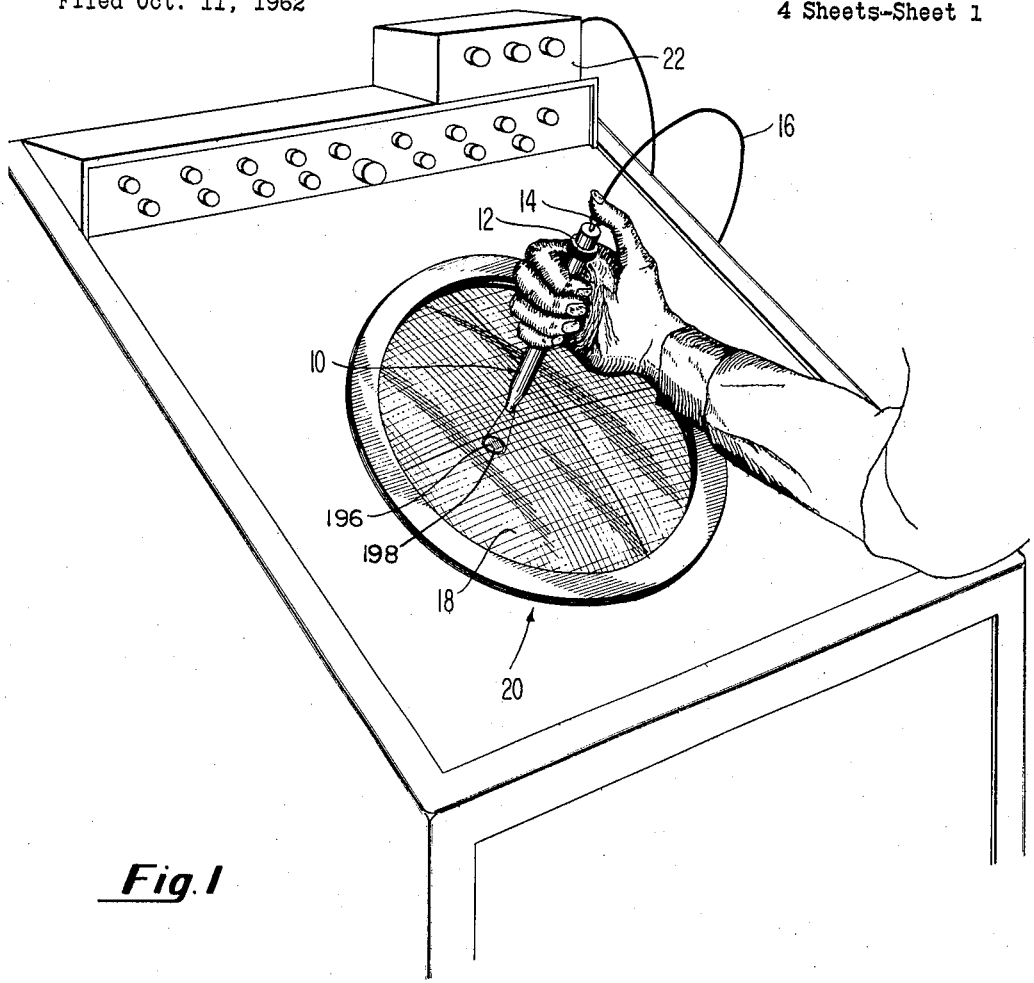
FIG. 1 is a perspective view of a functional console apparatus illustrating the operational environment of the present invention.

In modern communication systems wherein targets, e.g., objects in the field, etc., are displayed on a cathode ray tube such, for example, as radar plan position indicators at airport landing fields, TV information displays, etc., the display is produced on the face of the cathode ray tube most generally in a circular repetitive fashion. The information which is "written" on the face of the scope or tube obviously occurs at some particular instant of time. This instant of time is or can be recognized by means of the major equipment with which the present apparatus is associated. For example, a computer may be coupled to the present electro-optical apparatus and may store or retain a variety of types of information or data which it can readily forward to the display device in serial fashion if called upon to do so.

However, once the information is displayed on the face of the cathode ray tube, it is relatively unreliable since it is generally difficult to identify a specific target by its relative coordinate positions on the face of the tube, because the coordinates are not necessarily very precise in a scalar fashion. Thus, to use these coordinates to interrogate or address the computer complex becomes relatively inexact, inefficient, and sometimes impossible.

The time at which particular information is written is, however, a clear indication of what is being written, i.e., specifically which block or information target is being displayed on the scope, since each target is discrete in terms of time and targets are written serially one after the other. For example, if the computer has stored in it the coordinates of a typical case, e.g., an aircraft that is constantly being interrogated by radar, these coordinates may be extracted from the computer one at a time. As digital signals they may then be converted to analog signals and thereafter are "written" onto a cathode ray tube provided with an adequately long persistance phosphor at a sufficient repetition rate.

Obviously, the reviewing operator must be able to detect the particular signal at the time it is written with sufficient accuracy so that this signal may then be returned to the computer to request additional control information from the control using this original target signal as an address. The computer will then "know" that this specific target is associated with the block of information that is being requested. In other words, the present apparatus becomes the discriminating element of the overall equipment.

It has been the practice in the past to use some form of electro-optical device, previously referred to as a light gun, with apparatus of the type wherein a large number of targets are recorded, for example, on a rotating drum, and are extracted therefrom one at a time and thereafter converted to analog signals, i.e., deflection signals, and then displayed on a cathode ray tube. If at the time that the interrogating signal is returned to the computer it can be associated and identified with a particular block of information which the operator may be concerned with, there is a simple and efficient method and means for extracting the entire block of information or any part of the information from the computer for further employment in the system.

In contrast to this, the X and Y coordinate system requires the performance of a search to determine which target fits which of many descriptors. Also, it is noted that the X and Y coordinate locations are relatively unreliable because of the scale factors, etc. In a typical display device, for example, a cascade phosphor which is a typical type of display tube, a bit of information is formed as a pulse of light, e.g., a high rise in the illumination on the face of the scope or tube, which can be read photo-electrically. Even though its persistance may be long, at the time it is written it has a relatively sudden rise. This is also true of storage tubes even though their decay time may be extremely slow, possibly taking minutes. At the time that the information is written, there will be an instantaneous appearance of light at that particular location on the tube or scope.

With the present apparatus, all that is required of the operator is that a frame or circle of light be brought to focus on the particular area of information or "blip" which is to be interrogated. In this particular instance, the operator might be attempting to identify flights of aircraft and would like to know more about a particular flight, i.e., its altitude, speed, direction, etc. This information is not generally displayed since there is a limitation to the symbolic representations of a particular target which may be displayed as a trace upon a particular scope. However, by interrogating the computer with which the present apparatus is associated, this auxiliary information can be requested therefrom and then displayed on the tube itself, or it may be rewritten or punched out on other associated equipment.

The present apparatus provides a fountain pen-like structure of relatively small diameter and length and with reliable means for identifying the area that is being interrogated by the apparatus. Since in point of fact it is difficult, if not impossible, to place a physical viewing frame on this phosphor area, the phosphor being on the opposite or "other" side of the tube face, and usually some distance away due to the overlays and filters and other elements employed therewith, the present apparatus provides a "virtual finder" which takes the form of a projected light image. This light image is made to encircle or "ring" the area that the operator is viewing. The means for identifying the area is the light projected from the present novel apparatus.

Figure 2:
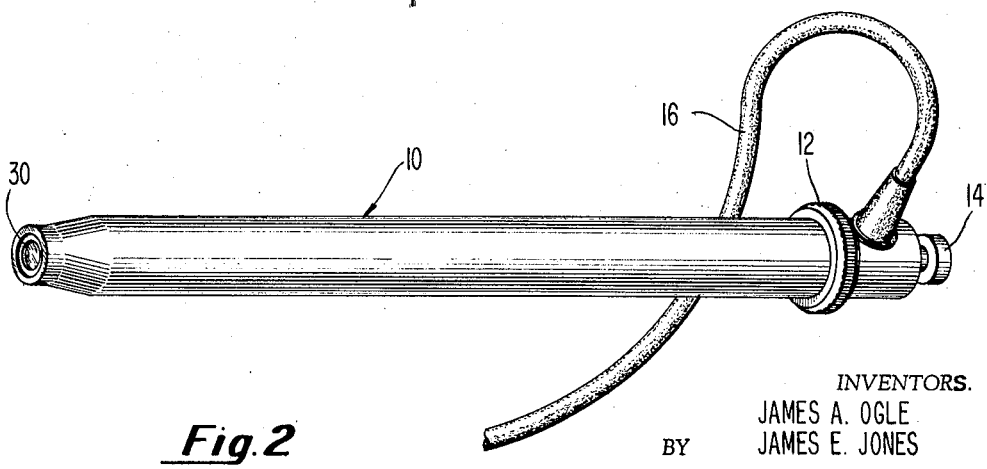
FIG. 2 is an isometric view of a preferred embodiment of the invention.

Referring now to the drawings and first to FIGS. 1 and 2 thereof, the present invention comprises an elongated substantially cylindrical member 10 including a demountable retaining ring or nut 12 at one end thereof for assembly of the apparatus as well as servicing a plunger type switch 14. An electrical multi-conductor connecting cable 16 extends away therefrom. The member 10 hereinafter referred to as the light gun, is adapted to be conveniently hand held as seen most clearly in FIG. 1. The gun 10 may be positioned over the communication control display apparatus 20 with the cable 16 conveniently interconnected to the input portion 22 thereof in any convenient manner, or, the gun may be held a slight distance away from the plate 18 and visually focused thereon.

Figures 3, 4:
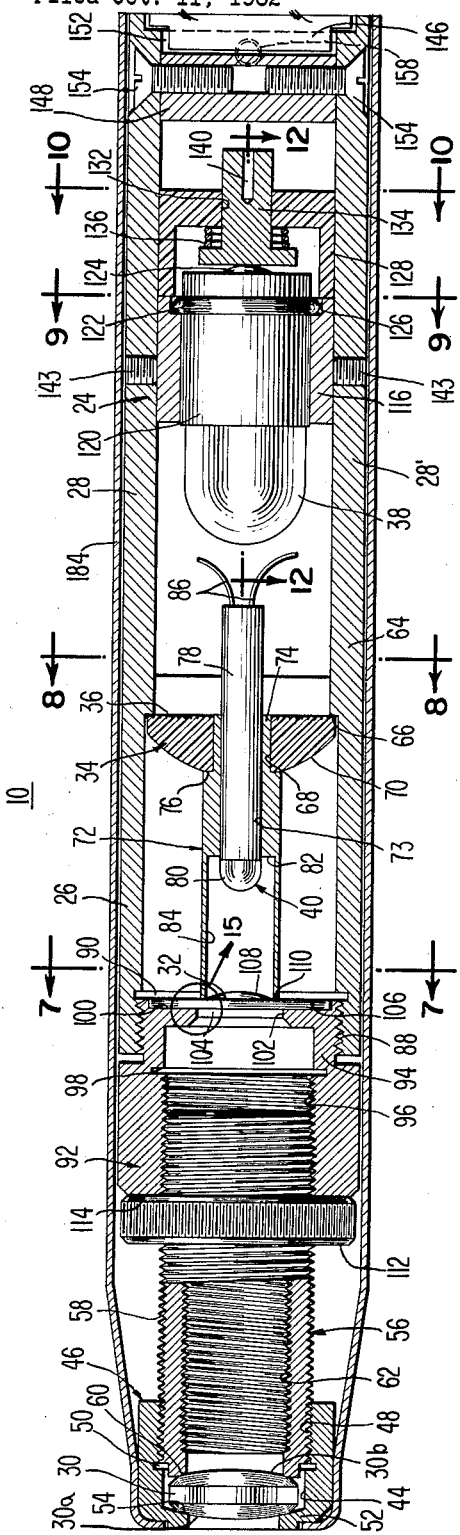
FIG. 3 is a greatly enlarged sectional view of a major portion of the apparatus of FIG. 2.
FIG. 4 is a greatly enlarged sectional view of portions of the apparatus as shown in FIG. 3.

The present apparatus is self-contained (FIG. 3), substantially self-supporting unitary assembly and generally is seen to comprise an elongated substantially cylindrical structure 24, the left end portion 26 of which forms an external protective supporting housing and enclosure for other parts of the device still to be described, while the rightward end is bifurcated forming two parallel spaced apart coextensively leg portions 28–28' of generally wedge shaped cross section, FIG. 5. A front objective lens 30, FIG. 3, is demountably adjustably disposed adjacent and in operable relation to portion 26 for relative movement adjacent and spaced from a target field lens 32. Behind the target lens 32 and in coaxial alignment therewith is located a finder field lens 34. A lenticular optical element 36, e.g., half cylinder ribs is or may be disposed adjacent the rear surface of field lens 34 as described hereinafter. Adjustably arranged coaxially of the finder field lens 34 is a demountable adjustably positionable illuminating element such as a light bulb 38. A photosensitive device 40 e.g., a solid state component, is arranged concentrically of the finder field lens 34 and coaxially of the target lens 32 in a manner and for purposes which will be explained shortly.

Rearwardly of the light bulb 38, FIG. 4 is located an electrical circuit panel or board 42 including for example, a solid state amplifier, etc., (not shown) for amplifying the weak signal produced by the photosensitive member, e.g., photosensitive diode or similar solid state device 40 in response to the target illumination from the cathode ray tube display 20, as will hereinafter be described. To the extreme right of the circuitry 42 and adjacent connecting cable 16 is located momentary contact push-button switch 14. The cooperative arrangement of each of these components will now be described in detail.

As seen most clearly in FIG. 3, the objective lens 30 having equiconvex oppositely disposed spherical surfaces 30a and 30b is mounted axially within the open bore 44 of a cup-shaped front lens holder 46. The right-hand portion of holder 46 is internally threaded, as indicated by reference character 48, terminating in the thread relief 50. The inwardly turned rim 52 of member 46 is provided with a chamfer 54 angled to match the spherical radius of the surface 30a of lens 30. An elongated focusing barrel or tube 56, externaly threaded as at 58 for longitudinal adjustment, is provided with a chamfered end 60 to match the spherical radius of lens surface 30b. Lens 30 is adapted to be retained and axially aligned between the chamfers 54 and 60 by threading the member 46 onto the left end of member 56 so as to secure the lens in the relative position shown in FIG. 3. The inner bore of tube 56 is or may be threaded as indicated by reference character 62 or this interior surface may be painted dull black so as to prevent unwanted reflections therewithin.

Adjacent the base 64 of the bifurcated portion, i.e., legs 28–28', an external circular ledge 66 is formed in the assembly in suitable fashion, e.g., by milling, etc. Finder field lens 34 which is provided with a hollow axial bore 68 for purposes to be explained presently, is seated against the ledge 66 with it convex surface 70 oriented to the left in FIG. 3. An elongated cylindrical photosensitive cell holder 72 having an undercut end portion 74 is press-fitted into and glued or adhesively bonded to the bore 68 of lens 34 with the shoulder 76 of member 72 against the convex surface 70. Light responsive element 40, encased in a sleeve 78 of dielectric material, is pressed into and partially through the bore 73 of holder 72, so as to locate the lens element 80 of the element 40 slightly forward of the base 82 of the internal cylindrical chamber 84 of the holder 72. Electrical leads 86 extend away from the rear end of the element 40 for attachment to circuit panel 42 in a known manner.

The open end of portion 26 of the cylindrical structure 24 is provided with internal threads 88 terminating rightwardly in a thread relief 90. A hollow cup-shaped cylindrical adjustable collar 92 having an undercut externally threaded portion 94 and an internally threaded bore 96 terminating in a thread relief 98, is provided with a circular lens receiving recess 100, milled, drilled or other wise formed in the rightward end thereof. The internal surface 102 adjacent the opening 104 of the rightward portion of the collar 92 is chamfered at a slight angle to prevent light interference as will appear more clearly later on.

Target field lens 32, as seen in FIG. 3, is disposed within recess 100 with its flat surface or face 106 flush with the base of the recess. When the member 92 is threaded into the end 26 of the member 24 the convex lens portion 108 extendnig rightwardly away therefrom and is effectively surrounded by the cylindrical open end 110 of the photosensitive cell holder 72, placing the photo member 40 on the optical axis of the lens 32 for purposes to be explained hereinafter. An externally knurled internally threaded jam nut 112 is threadedly received over the member 56 so as to abut the surface 114 of the collar 92 thereby providing means for securing the various members of the lens assembly against accidental movement after suitable focusing adjustments have been accomplished.

Lamp 38 is adapted to be movable longitudinally as well as rotatably for orientation relative to lenticular lens 36 of the assembly, i.e., parallel to legs 28–28' for insertion and removal. To this end the lamp assembly is located between legs 28–28' by means of a lamp holder 116 which, as seen in the sectional view of FIG. 9, is provided with similar upper and lower wedge shaped cut outs 118—118 for mating engagement with the wedge shaped legs 28–28'. Lamp 38 with its conductive body portion 120, peripheral stop rim 122 and conductive end contact 124, is slid into the rightward end of lamp holder 116, FIG. 3, so that the rim 122 rests against the ledge 126 of the holder 116.

A dielectric lamp retainer member 128 is seen in FIG. 10 to include oppositely disposed wedge shaped cut outs 130—130 and a central open bore 132 into which a T-shaped conductive electrical contact member 134, biased by spring 136, is slidably receivable. With the lamp 38 inserted in holder 116 the retainer member 128 is secured thereto by means of bolts 138—138 into threaded holes 140, FIG. 12. Electrical lead wires 140 for the lamp assembly are led away therefrom through wire relief apertures 142 for interconnection into the circuitry 42. Lamp holder 116 is retained against dislodgement by means of set screws 143.

Electrical circuit panel 142 may be housed in a cylindrical cannister or container 144 shown in broken outline in FIG. 5, and may be mounted in the light gun assembly, 24, in tongue and groove fashion, by means of oppositely disposed tangs or tongues 146, FIG. 4, as will now be described.

A spacer or bulk head member 148, FIG. 11, including opositely disposed wedge shaped cut outs 150—150 and a transverse slot 152 is secured by means of bolts 154 between the parallel wedge shaped legs 28–28' with the slot 152 to the right or rearwardly of the assembly. Wire reliefs 156 permit leads from the bulb 38 and the photodiode 40 to be passed rightwardly to the circuit 42. Set screws 158 secure the board 42 within slot 152.

A clamp member 160 similar to member 148 and including wedge shaped notches 162, is mounted at the open end of legs 28–28' by means of bolts 164 and forms a termination for the assembly.

The rightward tongue 146' of the printed wiring panel or circuit board 42 is supported in the slot 152' of clamp 160 in similar fashion to the opposite end thereof.

The electrical conductors for the photo member 40 as well as the electric lamp 38 are cabled together and then fed back rightwardly out through the enlarged opening 166 in clamp member 160 and through the bore of a coiled spring 168 one end of which presses against the back of clamp 160 while the right end is seated on a circular ledge 170 of cap member 172. An elongated hollow insulating grommet 174 is received in an aperture 176 in the side of the cap 172 and insulatingly feeds the conductive cabling 16 outwardly from the light gun assembly for attachment to the utilization device, such for example, as the computer.

The rightward end of the cap member 172 is provided with an aperture 178 through which the mounting stem 180 of the momentary contact switch 14 is secured by means of nut 182. The actuating plunger 187 concentrically projects beyond the cap 172 for ease of handling and so that the apparatus may be energized in suitable fashion as by means of the operator's fingers or thumb.

An elongated rigid cylindrical jacket or cover 184 carrying a threaded flange 186 at one end thereof is adapted to surround and enclose the entire bulk of the light gun assembly. A knurled locking nut 188 having an internally threaded bore 190 and a concentric inwardly turned rim 192 is receivable over the projecting flange 194 of the cap member 172. It is apparent that once the nut 188 is threaded down over the threaded flange 186 on the jacket 184, the spring 168 forces the entire assembly together into a relatively tight compact unit, preventing any accidental dislodgement of the internal working parts thereof. The device thus provided is quite easily and efficiently fabricated and assembled as well as disassembled for necessary service, repair and/or replacement of parts.

In operation of the device, assuming that it is desired to identify an object area on a cathode ray tube display such for example, as a small circle 196, FIGS. 13 and 14, approximately ⅛ inch in diameter. The light gun has been focused on this area in a manner which will be explained hereinafter so as to ring or surround the object area with a tiny circle of light 198. The light from the area 196, i.e., blip or target, forms an image of this ⅛ inch diameter area on the end of lens 32. This lens which as earlier described, has a convex surface with a single convexity which is oriented toward the right, and serves as a field lens and in back trace it forms an image of the photocell substantially in the objective lens 30. The objective lens is oversized with respect to this function thus making the position of this image longitudinally and laterally relatively non-critical. It is desirable, of course, that it be relatively central in order to minimize parallax. The fact that it is smaller than the aperture limits the relative aperture of the system and thus increases its depth of focus beyond that which would be apparent from the aperture alone. The image of the photosensitive area of the member 40 is relatively small so that it is operating therefore at a relatively small so called "f" number. As the light strikes this area the photocell 40 produces a certain amount of preamplification after which the signal is forwarded to the preamplifier 42 where it is electronically preamplified and thence sent via the conductive cable 16 to the utilization device, e.g., computer.

The distance that the apparatus is disposed relative to the cathode ray tube surface may be relatively critical so that means for focusing is built into the device. It can be preadjusted by means of the knurled nut 112 which acts to change the relative distance between the image plane which is at the plane of the field lens 32 and also at the rear face of the collar member 92. In this operation the forward member 46 holding the objective lens 30 is movable relative to the rearward member or collar 92 holding the field lens 32. From an optical point of view, this provides means to focus the apparatus so as to adjust it for the particular application. It should be apparent that whether one, two, three or more overlays are used over the cathode ray tube is not generally known beforehand and thus the present invention accommodates for such variables by enabling the photo-optical apparatus to be positioned an inch or an inch and a quarter approximately (optical distance) from the phosphor of the tube and then to be adjusted for proper focus accordingly.

Thus it is seen that the circular area of about 1/8 inch in diameter approximately one to one and a quarter inches away from the photo-optical apparatus is imaged onto the end 80 of the member 40 and the light is then collected onto the photosensitized portion of the device. The electrical signal developed by the photosensitive area of the detector 40 is as beforementioned, forwarded through the system to the computer.

The forward portion of the tubular supporting member 72 supporting the photosensitive element 40 is provided with relatively thin walls. Thus by disposing the movable collar member 92 in front of the field lens element 32, which element has a relatively thin cross section, it is possible to define in one plane, the inside and outside diameters of a circular aperture 200, FIG. 15—the inside diameter being the O.D. of the wall of the tubular support 72 for the member 40 while the outside diameter is the rear I.D. 102 of the reduced portion of the collar member 92 in its rear flange. This circular aperture 200 is seen in FIGS. 13 and 15 (extreme outer trace in FIG. 13) and is sufficient to encircle the area 196. It thus becomes the object of the objective lens 30 and will be imaged by the same trace onto the phosphor surrounding the area which traces to the I.D. of the tubular supporting member supporting the photosensitive member 40. The system is thus provided with means for producing a ring of light and for receiving back the light output from the encircled area without beam splitting or other electrical or electro-mechanical mechanisms.

If the working relative aperture through which this annular aperture is imaged onto the phosphor of the tube is as great or greater than the working relative aperture through which the phosphor is imaged onto the field stop of the photocell, then the focusing of the projected target ring will be visual evidence of the focusing of the detector means as well as its alignment. A skilled observer-operator can perform this operation quite easily in three dimensions because of this direct visual reference.

The nominal O.D. of the entire structure is about 3/8 to 1/2 inch. This desirable moderately tiny overall dimension has been achieved by placing the illuminating lamp or bulb 38 axially behind the photocell 40 in the next available position, literally and imaging it onto the objective lens 30 via an annular condenser or finder field lens 34. These two terms are used interchangeably since both lenses look quite similar in the same ray tracing. Their function is different and one usually collects the light and feeds the aperture of an objective or a gate where the other tends to receive light from a pupil and condenses it onto other pupil or active device. In the present apparatus the finder field lens 34 acts as a condenser.

In apparatus of this order it is extremely desirable that the wattage of the lamp 38 be consistent with the heat dissipation potential of such a small structure as well as being compatible with the lead wire requirements thereof. Also its voltage should be consistant with other voltage requirements in order to be able to package preamplifier circuitry in the same area. However, it is desirable that the filament 204 of the lamp be properly centered. It is well known that miniature lamps are notoriously vague as to geometrical precision and that at the same time in a small structure, such as this, it is inconvenient to engineer into the apparatus centering screws, etc. as a means for achieving actual centering.

In the present apparatus the illuminating lamp 38 is made to be rotatable about the axis of the cylindrical structure 24 which supports the entire assembly. When the condensing lens system 34 has one insensitive azimuth, if the lamp is rotated to where its major eccentricity lies in this insensitive azimuth the requirements of the system are satisfied. This is achieved by introducing a lenticular spreader 36 adjacent the rear surface of the lens 34. This member may be an integral part of the lens 34 or it may be an independent element which is adhered thereto as by glue for example, or is co-mounted therewith.

Thus by making the whole assembly coaxial the requirements of the system are easily satisfied and the lamp need only be aligned in one azimuth. Also, by designing relatively simple shapes for the lens elements, as seen in FIG. 1, it was possible to make these elements self supporting. Thus the photosensitive member 40 is supported in the center of the system and in the present embodiment it is located in the end of the tubular support 72. The rear portion of the tubular support 72 is seated in a bore 68 conveniently machined in lens 34. The front end of member 72 is seated on the outside diameter of the convex target lens 32. In this manner one aperture surrounds another aperture. The inner one being the detector region and the outer one the object of the finder system, and the means for illuminating the outer one is the light bulb 38 while the light coming through the inner one is supplied to the photo member 40. Thus, even though the filament 204 is off center the diffused filaments image still covers the region of interest. The lenticular spreader 36 is thus seen to provide a novel means for avoiding having to provide extremely sophisticated centering means.

As shown in the idealized ray traces of FIG. 13 the apparatus views an object area 196 to the left of the drawing. The ring of light 198 effectively acts as the finder. The objective lens 30 is positioned some distance X away from the object area on an optical center line. The image of object area 196 falls on the end of the tube with its field lens 32 mounted as shown. This lens has only one curved portion simply for the sake of simplicity. Immediately behind this lens is the photodiode 40 with its photoseisitive area 197, as enlarged by the lens 80 of the member 40. The photodiode 40 is positioned relative to the lens and is spaced and adjusted so that the image of this virtual sensitive area is formed at or near the objective lens 30 in order to obtain uniformity of response throughout the inner photo detector field 199. In this manner the blip of light will be detected by the light gun apparatus if, and only if, it lies within the detector field.

The finder area is defined by having an aperture sufficiently in the plane of the inner aperture that the depth of focus of the system is sufficient to tolerate a certain range of movement. This arrangement provides a sharp ring of light that is sufficient for encircling the area of the blip or object. The filament 204 is behind the finder lens and is imaged through this lens. As seen in FIG. 13, the principal rays from lens 34 are not used, only those through the outer zones are employed.

Briefly, in operation of the device, light is projected from the bulb 38 forwardly, i.e., leftwardly through the peripheral portion of the finer field lens 34 and likewise through the peripheral portion of the target field lens 32 out through the objective lens 30 to the display apparatus 18 to encircle the target image 196. Light from the target 196 is collected through the objective lens 30 passing through the target field lens 32 to impinge on the photo diode 40. An electrical current signal output produced by the member 40 whenever the confronted light intensity abruptly changes from one level to another, is fed back through the conductive leads to a preamplifier 42 disposed within the hollow confines of the rear portion of the member 10. The preamplified signal is fed by means of the cable 16 out the rear of the assembly to the console 22 thence to a computer, not shown. The processing equipment then determines the identity, altitude etc. of the aircraft, if such is the target, causing the blip at the range and azimuth indicated.

What is claimed is:
1. Photo-optical transducer apparatus comprising,
   (a) a source of illumination,
   (b) a condenser lens coaxially disposed relative to said source,
   (c) means coaxially arranged relative to said condenser lens to diffuse and spread said light,
   (d) a target field lens coaxial with and spaced from said condenser lens,
   (e) means concentric with said target field lens forming an aperture through which light from said condenser is obliged to pass,
   (f) an objective lens coaxial with said target field lens for projecting light from said source through said aperture onto a target area adjacent said objective lens,
   (g) means for adjusting said objective lens relative to said target field lens thereby to focus said light onto said target area,
   (h) and, photo-responsive signal generating means coaxially arranged with respect to said target field lens for receiving direct light from said target area.
2. Photo-optical transducer apparatus comprising,
   (a) a source of illumination,
   (b) a condenser lens disposed in the path of light from said source,
   (c) means to diffuse and spread said light,
   (d) a target field lens in the path of said light,
   (e) means adjacent said target field lens forming an aperture through which light from said condenser is obliged to pass,
   (f) an objective lens coaxially arranged with respect to said target field lens for projecting said light from said aperture onto a target area adjacent said objective lens,
   (g) means for adjusting the relative position of said objective lens with respect to said target field lens thereby to focus said light onto said target area,
   (h) and, photo-responsive signal generating means coaxially arranged with respect to said target field lens for receiving direct light from said target area.
3. Photo-optical transducer apparatus comprising,
   (a) a source of illumination,
   (b) a condenser lens for collecting light from said source of illumination,
   (c) means to diffuse said light from said source,
   (d) a target field lens coaxially arranged relative to said condenser lens,
   (e) means concentrically arranged relative to said target field lens and forming a concentric aperture through which light from said source is obliged to pass,
   (f) an objective lens for said apparatus,
   (g) means to adjust the position of said objective lens relative to said target field lens thereby to focus light from said source through said aperture onto a target area adjacent said objective lens,
   (h) and, a light responsive signal generating member coaxially disposed intermediate said target field lens and said condenser lens responsive to direct light from said target area for producing a signal output therefrom for application to a utilization device.
4. Photo-optical transducer apparatus comprising,
   (a) a source of illumination,
   (b) means mounting said source of illumination for axial longitudinal movement,
   (c) a condenser lens adjacent said source of illumination for collecting light therefrom,
   (d) means adjacent said condenser lens for diffusing the light from said source with respect to said condensing lens,
   (e) target field lens,
   (f) means mounting a light responsive signal generating member between said condenser lens and said target field lens,
   (g) said mounting means including means for shielding said light responsive member from light from said source,
   (h) means providing an aperture concentric with said target field lens,
   (i) means mounting an objective lens adjacent said target field lens in coaxial alignment therewith and including means for adjusting the relative position of said objective lens with respect to said target field lens so as to focus light from said source onto an image framing a target area adjacent said objective lens and so that direct light from the target area may be focused back upon said light responsive member.
5. Photo-optical transducer apparatus comprising,
   (a) a source of illumination,
   (b) a condenser lens adjacent said source of illumination,
   (c) lenticular optical means adjacent said condenser lens for spreading and diffusing light from said source to said condenser lens,
   (d) means adjustably mounting said source for movement toward and away from said condenser lens,
   (e) a photocell,
   (f) a target field lens,
   (g) means mounting said photocell coaxially of said target field lens and said condenser lens and shielding said photocell from the light from said source,
   (h) means adjacent said target field lens and said photocell mounting means providing an aperture through which light passes from said source,
   (i) an objective lens, and
   (j) adjustable means mounting said objective lens adjacent said target field lens for relative movement therebetween whereby light from said source is focused through said aperture onto a target area adjacent said objective lens and whereby direct light from said target area is focused upon said photocell thereby to produce a signal output therefrom for application to a utilization device.
6. Photo-optical transducer apparatus comprising,
   (a) a demountable source of illumination,
   (b) a condenser lens having an axial bore therethrough,
   (c) a lenticular optical element likewise provided with an axial bore integral with said condenser lens,
   (d) a target field lens having a convex portion thereon,
   (e) a photocell,
   (f) means mounting said photocell intermediate said condenser lens and the convex portion of said target field lens with one end of said mounting means disposed axially through said bore in said condenser lens and the opposite end of said mounting means straddling said convex portion of said target field lens,
   (g) means adjacent said target field lens and said photocell mounting means providing an aperture through which passes light from said source,
   (h) an objective lens, and
   (i) means adjustably mounting said objective lens for relative movement with respect to said target field lens whereby light from said source is focused through said aperture and said objective lens onto a target area and direct light from said target area is focussed back through said convex portion of said target field lens onto said photocell effective to produce a signal output therefrom.
7. Photo-optical transducer apparatus comprising,
   (a) a source of illumination,
   (b) a condenser lens having an axial bore therethrough disposed adjacent said source of illumination,
   (c) a lenticular lens concentric and integral with said condenser lens, for spreading and diffusing the light through said condenser lens,

(d) a target field lens,
(e) means mounting said target field lens coaxially of said condenser lens and spaced apart therefrom,
(f) a photocell,
(g) an opaque cylindrical photocell mounting means one end of which is received through the bore of said condenser lens and the opposite end of which surrounds said target field lens,
(h) said target field lens mounting means and said photocell mounting means positioned in a manner providing a peripheral circular aperture adjacent said target field lens through which light from said source is projected,
(i) an objective lens, and
(j) means mounting said objective lens for rectilinear movement toward and away from said target field lens effective to focus light admitted through said circular aperture and said objective lens toward a target area for impingement onto said target area and wherein direct light from said target area is focussed back upon said photocell effective to produce a signal output in response thereto.

References Cited by the Examiner

UNITED STATES PATENTS

| | | | |
|---|---|---|---|
| 1,860,575 | 5/1932 | Gehrke | 88—57 |
| 2,271,227 | 1/1942 | Lee | 88—57 |
| 2,420,716 | 5/1947 | Morton et al. | 250—227 |
| 2,816,705 | 12/1957 | Thrall et al. | 250—202 |
| 2,838,683 | 6/1958 | Munro | 250—227 |
| 2,855,589 | 10/1958 | Baker et al. | 250—217 |
| 2,903,690 | 9/1959 | Slack | 250—227 X |
| 2,915,643 | 12/1959 | Mork | 250—217 |
| 3,130,317 | 4/1964 | Connelly et al. | 250—227 |

RALPH G. NILSON, *Primary Examiner.*

ARCHIE R. BORCHELT, *Examiner.*